US009003445B1

(12) United States Patent
Rowe

(10) Patent No.: US 9,003,445 B1
(45) Date of Patent: Apr. 7, 2015

(54) CONTEXT SENSITIVE THUMBNAIL GENERATION

(75) Inventor: Simon M. Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/469,006

(22) Filed: May 10, 2012

(51) Int. Cl.
  G06F 3/00 (2006.01)
  G06F 13/00 (2006.01)
  H04N 5/445 (2011.01)
  H04N 19/20 (2014.01)

(52) U.S. Cl.
  CPC ..................................... H04N 19/20 (2013.01)

(58) Field of Classification Search
  USPC .......................................................... 725/41
  See application file for complete search history.

(56) References Cited

U.S. PATENT DOCUMENTS

| | | | | |
|---|---|---|---|---|
| 6,020,930 | A * | 2/2000 | Legrand | 725/41 |
| 6,147,714 | A * | 11/2000 | Terasawa et al. | 348/564 |
| 8,117,282 | B2 * | 2/2012 | Jarman et al. | 709/219 |
| 2003/0074662 | A1 * | 4/2003 | Istvan et al. | 725/38 |
| 2006/0064716 | A1 * | 3/2006 | Sull et al. | 725/37 |
| 2006/0271947 | A1 * | 11/2006 | Lienhart et al. | 725/19 |
| 2007/0204297 | A1 * | 8/2007 | Gonzalez | 725/41 |
| 2008/0271077 | A1 * | 10/2008 | Kim et al. | 725/39 |
| 2009/0089826 | A1 * | 4/2009 | Card, II | 725/25 |
| 2010/0251318 | A1 * | 9/2010 | Simoes Rodrigues et al. | 725/114 |
| 2011/0134325 | A1 * | 6/2011 | Ahn | 348/569 |
| 2011/0138420 | A1 * | 6/2011 | Sanford | 725/41 |
| 2012/0210356 | A1 * | 8/2012 | Kiok et al. | 725/39 |

OTHER PUBLICATIONS

Chen, et al. "A Skin Detector Based on Neural Network", IEEE 2002 International Conference Communication, Circuits and Systems and West Sino Expositions, 2002, pp. 615-619, vol. 1.
Fuangkhon and Tanprasert, "Nipple Detection for Obscene Pictures", Proc. of WSEAS Int. Conf. on Signal, Speech and Image Processing, 2005, p. 315-320.
Fleck, M., et al., "Finding Naked People," Proc. Forth European Conference on Computer Vision, 1996, pp. 593-602.
Liu, R., et al., "Image Partial Blur Detection and Classification," IEEE Conference on Computer Vision and Pattern Recognition (CVPR), 2008, 8 pages.
Marcial-Basilio, J., et al., "Detection of Pornographic Digital Images," International Journal of Computers, 2011, pp. 298-305, Issue 2, vol. 5.

(Continued)

*Primary Examiner* — Robert Hance
(74) *Attorney, Agent, or Firm* — Fenwick & West LLP

(57) ABSTRACT

A system and methodology provide for automatic generation of thumbnail images of a video stream of images from a television channel. A still frame image of the video stream of the channel is captured. A plurality of content filters is applied to the still frame image to determine whether the image is suitable for display. Images can be filtered for offensive content, defective content, or advertising content. A filtered image that is appropriate for display is selected and stored. If the still frame image is inappropriate for display, a default thumbnail image is selected. The selected image is stored as a thumbnail image in association with EPG data for the television program. The thumbnail image and EPG data are sent for display to a viewer.

29 Claims, 5 Drawing Sheets

(56) References Cited

OTHER PUBLICATIONS

Scott, R., "Histogram Threshold by Max Contour Contrast," Wolfram Demonstrations Project, 2 pages, [online] [retrieved on Mar. 2, 2012] Retrieved from the Internet <URL:http://demonstrations.wolfram.com/HistogramThresholdByMaxContourContrast/>.

Tong, H., et al., "Blur Detection for Digital Images Using Wavelets Transform," International Conference on Multimedia and Expo (ICME 2004), 2004, pp. 17-20.

Wang et al. "WIPE (TM): Wavelet Image Pornography Elimination: A System for Screening Objectional Images", Computer Communications, 1998, pp. 1355-1360, vol. 21, No. 15, Elsevier.

Wikipedia, "Scale-invariant feature transform," last modified Mar. 2, 2012, 16 pages [online] [retrieved on Mar. 2, 2012] Retrieved from the internet <URL: http://en.wikipedia.org/wiki/Scale-invariant_feature_transform>.

* cited by examiner

CONTEXT SENSITIVE THUMBNAIL GENERATION

BACKGROUND

This disclosure relates generally to automatically generating a thumbnail image for display in association with a program on a television channel.

Thumbnail images of a television program can be presented in various contexts, such as a television guide, online advertisements, or page headers on web pages. Typically, these thumbnail images are pre-selected images, such as publicity photo for the television, and thus do not convey what is actually being shown on the program at the time the user is accessing the information. The thumbnail images are often associated with electronic program guide (EPG) data about the program.

However, merely using an image capture application to capture images from a live video stream may provide images of the program that contain pornographic, unpleasant, gruesome, or otherwise unsuitable content for a general audience and thereby unsuitable for use as a thumbnail image. Similarly, such arbitrarily captured images from a video stream include a blank screen captured between segments of the program, snapshots of commercials, or other inappropriate content. These images have little value to the viewer and do not convey the content of the program.

SUMMARY

A system and methodology provide for automatic generation of thumbnail images of a television program. A system is configured to receive video streams for a plurality of channels containing television programs. Still images are captured from the streams, to represent the current content being displayed. Each captured still frame image is filtered for appropriate content for display to a user. The still frame image can be filtered for offensive material, such as pornography or graphic content. The still frame image can also be filtered for defective content, such as a black or blue screen. The still frame image can be filtered for advertising content that is not part of the television program.

If the still frame image has been filtered and is suitable for display, a thumbnail image is generated from the still image and stored in an image cache. The thumbnail image can be associated with EPG data about the television program. If the still frame image is not appropriate for display, it is discarded, and a default thumbnail image is selected and stored. The selected thumbnail image and its associated EPG data are sent to a receiver, such as a television, set-top box, or mobile device as needed. For example, when the receiver displays the EPG, it retrieves the thumbnails for channels or programs to be listed in the EPG, either by request to the system or from a local memory storing the generated thumbnails.

The features and advantages described in this summary and the following detailed description are not limiting. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Described herein are various embodiments of systems, methods, and computer readable storage media for automatically generating a thumbnail image from a live video stream of a television program.

A television program is a segment of content that is distributed on a television channel. The television program can also be distributed by various types of networks, including cable, satellite, internet, or the like. The programs can be provided in either a broadcast mode or a narrowcast mode (e.g., video on demand, pay-per-view, or the like). The television program is distributed for display as a live video stream of images, and these images can be captured and stored. Television programs are associated with electronic program guide (EPG) data. The EPG data can include description about the program (e.g., description of the content, type or genre of program, names of actors, etc.), scheduling information, program ratings, and links to promotional material about the program. The EPG data can also include a default thumbnail image of the television program, for example, a publicity shot or pre-selected image of the program.

A thumbnail image is a reduced-size or scaled-down version of an image and can be used to represent the full-sized image. The thumbnail image can be a smaller version of a picture or a portion of a larger image. Thumbnails of still frame images captured from a live stream video are used to represent the content of the video.

Figure 1:
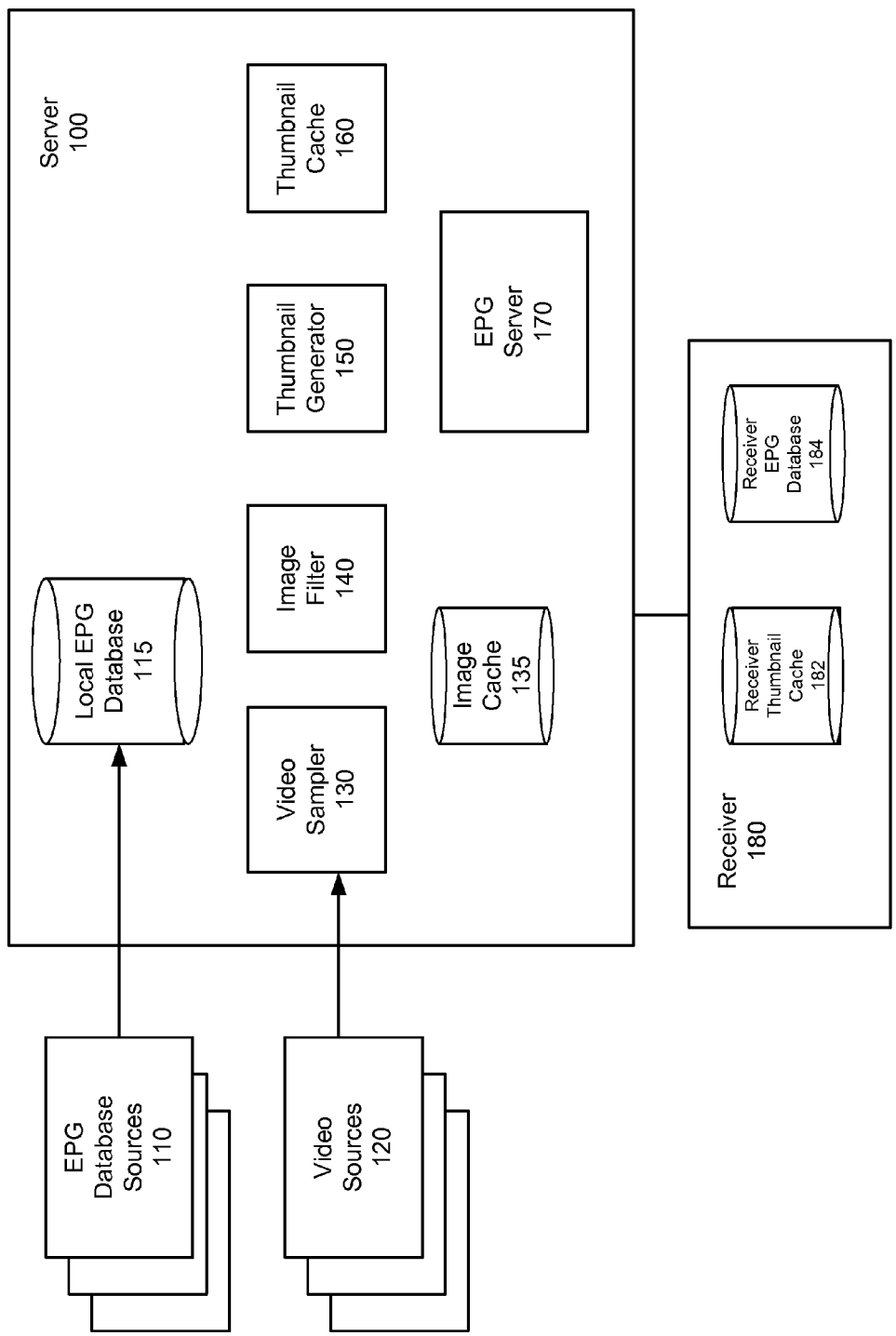
FIG. 1 is a high-level block diagram of a system environment, in accordance with an embodiment of the invention.

FIG. 1 is a high level block diagram illustrating the system environment, in accordance to one embodiment of the invention. As illustrated in FIG. 1, the system environment includes a server 100, one or more EPG database sources 110, and one or more video sources 120. The server 100 comprises a local EPG database 115, a video sampler 130, an image cache 135, an image filter 140, a thumbnail generator 150, a thumbnail cache 160, and an EPG server 170. The system environment also includes a receiver 180. The receiver can be a television, set-top box, personal computer, mobile device, or the like. The receiver 180 includes a receiver thumbnail cache 182 and a receiver EPG database 184.

The video sources 110 provide multiple video streams for a plurality of television programs. The video sources 110 provide video streams from a plurality of sources, such as third party content providers, broadcasters, networks, and the like. The video streams are organized into various channels.

The video sampler 130 receives the video streams from the video sources 120 and captures still frame images from the video streams. These images can be called still frame images, video images, or captured images. The still frame images can be tagged with a numeric identifier or other metadata that associates the image with the television program. The video sampler 130 can simultaneously process multiple video streams received from the video sources 120. The still frame images can be stored in the image cache 135 or sent directly to the image filter 140.

The image filter 140 receives a still frame image from the video sampler 130 or equivalently retrieves a still frame image from the image cache 135. In either case, for each image, the image filter 140 processes the content of the still frame image using one or more filters to determine whether the image is suitable for display in an EPG. The image filter 140 can process multiple images simultaneously, using multiple threads. Examples of the filtering modules are described in detail herein.

If the still frame image is filtered and found appropriate for display in an EPG, the thumbnail generator 150 generates a thumbnail image of the still frame image. The thumbnail generator 150 can reduce the size of the still frame image to a thumbnail size, using sub-sampling, cropping, aspect ratio modification, or any combination thereof, as well as other picture adjustments (e.g., contrast, exposure, color) as may be appropriate. The thumbnail generator 150 may also generate multiple different thumbnail versions of a given still image for display on different types of receivers, which may have differing amounts of screen area for displaying an EPG (e.g., a mobile device which typically has a very small screen as compared to a television). The thumbnail image is stored in a thumbnail cache 160.

If the still frame image is not appropriate for display, the image is discarded. A default thumbnail image for the television program, if available, is retrieved from the local EPG database 115 and stored in the EPG server 170 with the EPG data for the television program.

The EPG server 170 stores the default thumbnail image in association with EPG data about the television program. The EPG server 170 can retrieve EPG data about television programs from the local EPG database 115. The EPG server 170 also sends the thumbnail images and EPG data to the receiver 180.

When a viewer commands the receiver 180 to display an EPG, the receiver 180 requests thumbnail images, and if necessary, associated EPG data from the EPG server 170 for a plurality of channels. Which channels are requested depends on the implementation of the receiver's EPG, and can be a set of channels starting with a default starting channel for the EPG, or a set of channels starting with the viewer's current channel that are displayed to a viewer in a television guide, a set of channels selected by the viewer, or any other group of channels. The number of channels for which thumbnails are requested also depends on the implementation of the EPG, e.g., the number of channel shown at the same time in the EPG, as well as any additional channels before or after the displayed set that are to be cached. The receiver 180 receives the requested thumbnail images from the EPG server 170 for the requested set of channels and combines the thumbnails with existing EPG data that it already has in the EPG database 184, if that EPG data is current. If the EPG database 184 is not current, then the receiver 180 requests and receives both thumbnail images and the associated updated EPG data from the EPG server 170 for the plurality of channels.

The receiver 180 stores the EPG data and thumbnail image for each of the television programs. The receiver 180 refreshes and stores updated EPG data and thumbnail images each time it receives data from the EPG server 170. The thumbnail images are stored in a receiver thumbnail cache 182, and the EPG data are stored in the receiver EPG database 184. If a default thumbnail image is used, the default thumbnail image is retrieved from the receiver EPG database 184 and stored in the receiver EPG database 184. When the default thumbnail image is used, the receiver 180 retrieves the default thumbnail image from the receiver EPG database 183 for display.

Figure 2:
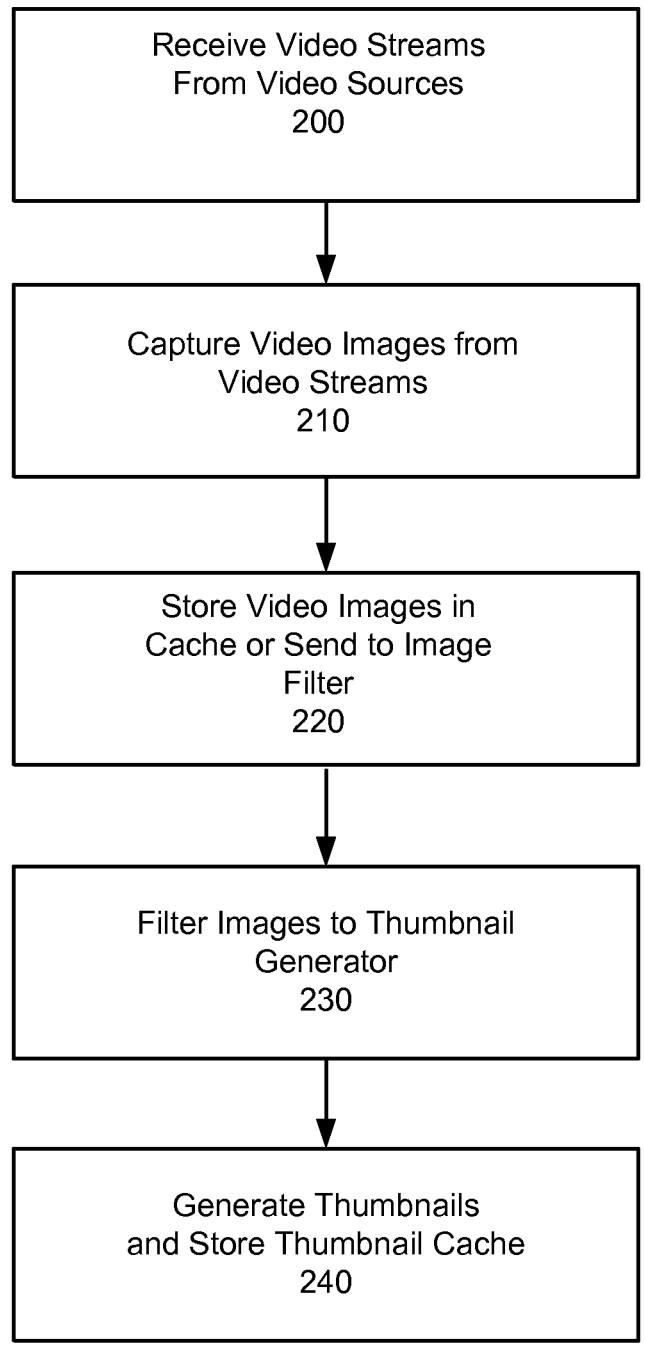
FIG. 2 is a flow diagram illustrating an example of a method for capturing a still frame image, in accordance with an embodiment of the invention.

FIG. 2 illustrates an example of a process for capturing still frame images and generating thumbnail images. Video streams are received 200, and a still frame image is captured 210 from each of the video streams. The video sampler 130 can capture a still frame image from the video stream at regular intervals (e.g., every 5 seconds, every 30 seconds, every 60 seconds, etc.). The captured still frame image is stored 220 in an image cache 135 or sent directly to the image filter 140. The image filter 140 filters 230 the still frame images and sends the filtered images to the thumbnail generator 150. The thumbnail image is generated 240 and stored in a thumbnail cache 160.

Figure 3:
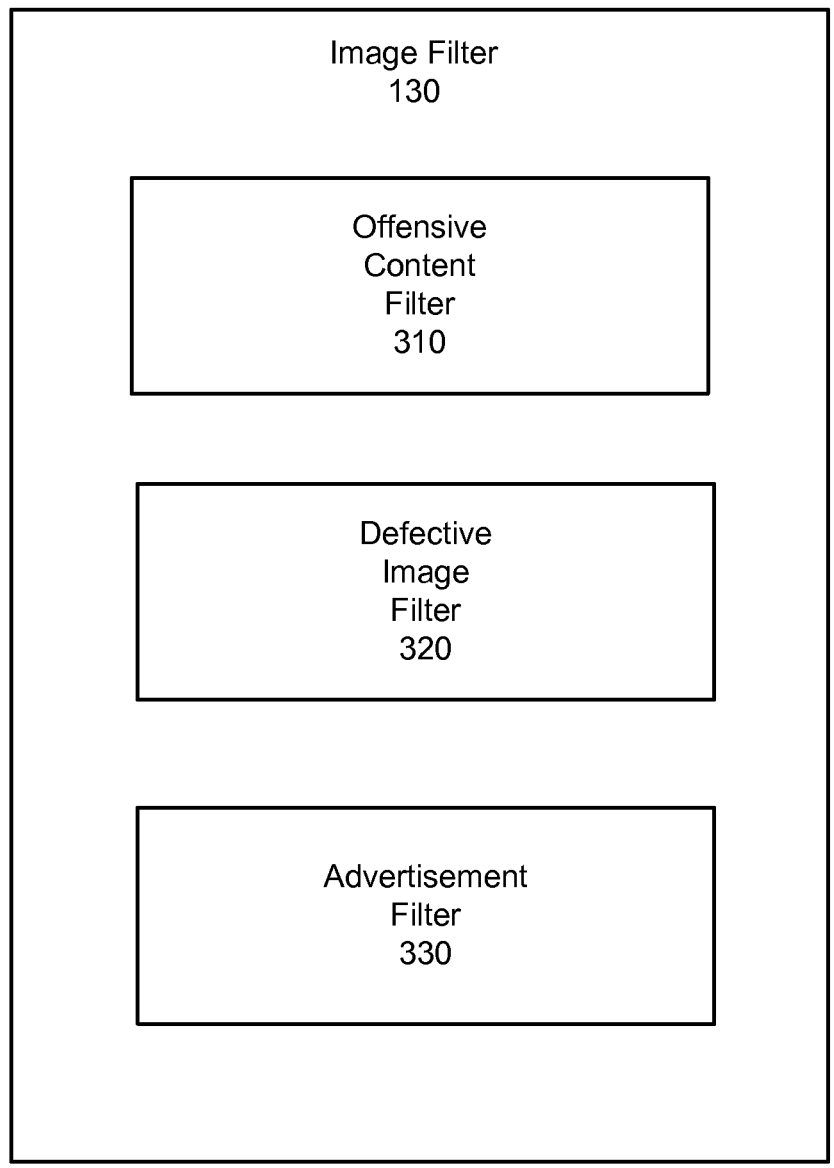
FIG. 3 is a high level block diagram illustrating the image filter, in accordance with an embodiment of the invention.

Referring now to FIG. 3, the image filter 140 comprises an offensive content filter 310, a defective image filter 320, and an advertisement filter 330. Other filtering modules can be included in the image filter 140. It would be understood by persons skilled in the relevant art that various other filters can be included without departing from the spirit and scope of the invention.

The offensive content filter 310 receives the still frame image and detects the presence of offensive images. In one aspect, the offensive content filter 310 is configured to detect pornography. Any suitable pornographic or erotic imagery detection algorithm may be used. Examples include Forsyth et al., "Finding Naked People," Proc. Forth European Conference on Computer Vision. pp. 593-602, 1996; Wang et al. "WIPE™: Wavelet Image Pornography Elimination: A System for Screening Objectional Images", Computer Communications, vol. 21, no. 15, pp. 1355-1360, Elsevier, 1998; Chen et al. "A Skin Detector Based on Neural Network", IEEE 2002 International Conference Communication, Circuits and Systems and West Sino Expositions, vol. 1, 615-619, 2002; Fuangkhon and Tanprasert, "Nipple Detection for Obscene Pictures", Proc. of WSEAS Int. Conf. on Signal, Speech and Image Processing, p. 315-320, 2005; Marcial-Basilio et al., "Detection of Pornographic Images," International Journal of Computers, Issue 2, Vol. 5, 298-305, 2011.

The captured still frame image can also be filtered by a defective image filter 320. As shown in FIG. 3, the defective image filter 320 determines whether the captured still frame image is defective. A defective image includes a black or blue picture, blank pictures, distorted images, or out-of-focus images. A defective image can be captured if the video sampler 130 captures an image when the video stream is transitioning in between two programs or in between the program and an advertisement.

In one embodiment, the defective image filter 320 determines whether the image is defective by using an image contrast algorithm. The defective image filter 320 selects a plurality of rows or vertical lines in the video image for image contrast comparison. For example, the defective image filter 320 can select every $10^{th}$, $20^{th}$ or $50^{th}$ row in the image. Next, the defective image filter 320 selects a pixel in the row and compares the RGB values of the pixel to its nearest neighbor pixels. The defective image filter 320 calculates the RGB value for each of the pixels in the row and determines the maximum difference in the contrast of color for the entire row of pixels. The average maximum contrast can be calculated for all of the pixels in a given row. If the maximum contrast in color for the row is less than a pre-determined value, then the defective image filter 320 determines that the pixels in that row have the same color. For example, if the pre-determined value is set very low, and the maximum contrast for the entire row of pixels is less than the pre-determined value, it is likely that the row of pixels all have a dark color. If multiple rows of the same image have a maximum difference in contrast less than the pre-determined value, the defective image filter 320 can determine that the image is defective.

In another embodiment, the defective image filter 320 determines whether the image is a blurred, out-of-focus, or distorted image. The image can also be partially blurred or partially distorted. The defective image filter 320 can use algorithms for detecting blurry images, such as those described by Liu et al. "Image Partial Blur Detection and Classification" IEEE Conference on Computer Vision and Pattern Recognition (CVPR), 2008; Tong et al. "Blur Detection For Digital Images Using Wavelet Transform", International Conference on Multimedia and Expo 2004 (ICME 2004). If the defective image filter 320 determines that the image or a part of the image is blurry or distorted, the image is discarded.

Various image contrast algorithms can also include interactive slider methods, a contour-contrast algorithm, or an Otsu min-variance algorithm. It would be understood by persons skilled in the relevant art that various image contrast algorithms can be used to detect defective images without departing from the spirit and scope of the invention.

Also shown in FIG. 3, the image filter 140 can include an advertisement filter 330. The advertisement filter 330 determines whether the still frame image is an advertisement. To determine whether a still frame image was captured from the television program or from an advertisement, image comparison methods are used. An image repository is used to store information describing images of known advertisements; the advertisement images can be themselves captured from videos, or provided by the advertisers. The captured still frame image is then compared against the information the image repository. Image comparison may be done based on information for features derived from the visual content of the images, such as Laplacian-of-Gaussian (LoG), Scale Invariant Feature Transform (SIFT), keypoint matching, color histograms, motion rigidity, texture, filter responses (e.g. derived from Gabor wavelets), including 3D filter responses, edges detected by a Canny edge detector, gradiant location and orientation histogram (GLOH), local energy-based shape histogram (LESH), or speeded-up robust features (SURF). Generally, features of the still frame image and the comparison image are detected, and matching features are identified. If a threshold of matching features is reached between the video image and the sample advertisement image, the advertisement filter 330 determines that the video image is likely to be an advertisement.

In some instances, more than one image comparison is performed to determine whether the still frame image is an advertisement. If the still frame image is determined to be an advertisement, the advertisement filter 330 removes the still frame image.

Figure 4:
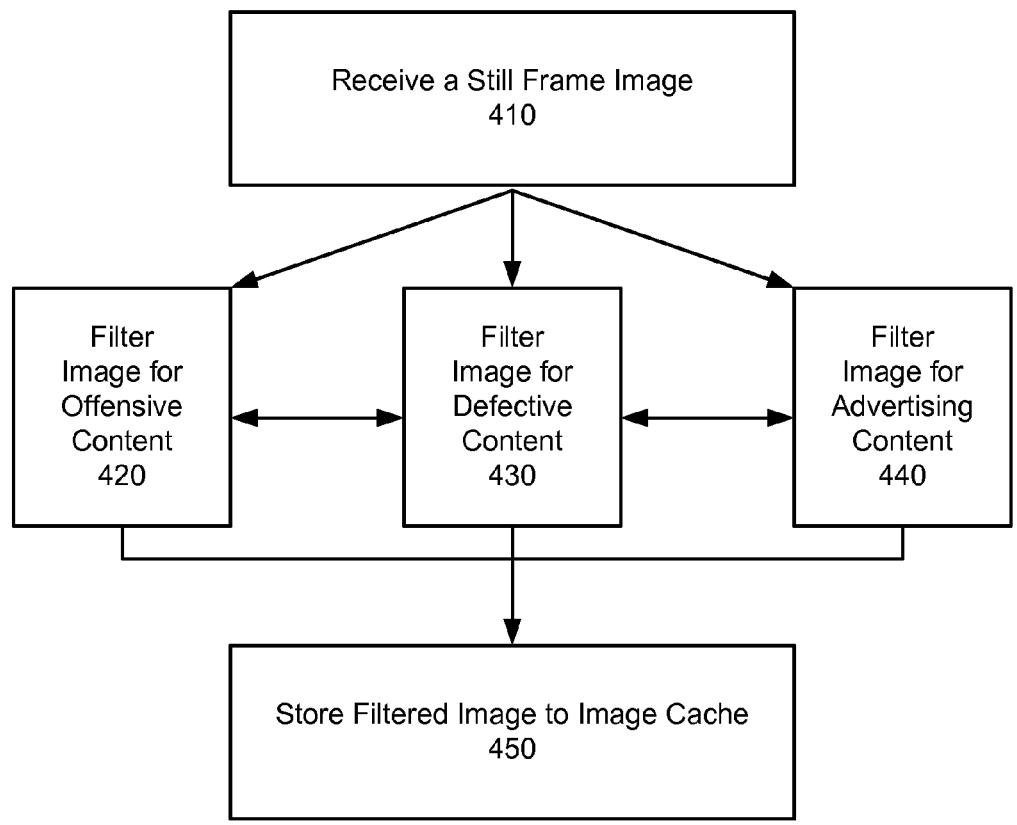
FIG. 4 is a flow diagram illustrating an example of a method for filtering a still frame image, in accordance with an embodiment of the invention.

FIG. 4 is an example of a flow diagram illustrating a method for filtering the content of a still frame image, in accordance with an embodiment of the invention. As described above, the filtering method is conducted by the image filter 140. The method includes receiving 410 a still frame image from the video sampler. Next, the still frame image is filtered for appropriate content. The method includes filtering 420 the still frame image for offensive content, filtering 430 the still frame image for defective content, or filtering 440 the still frame image for advertising content. The still frame image can be filtered using one or more of the filters, and the filtering process can be performed in various orders. The filtered still frame image is stored 450 in the image cache 135. These images will be used subsequently by the EPG server 170 when providing program or guide information to the receiver 180.

Figure 5:
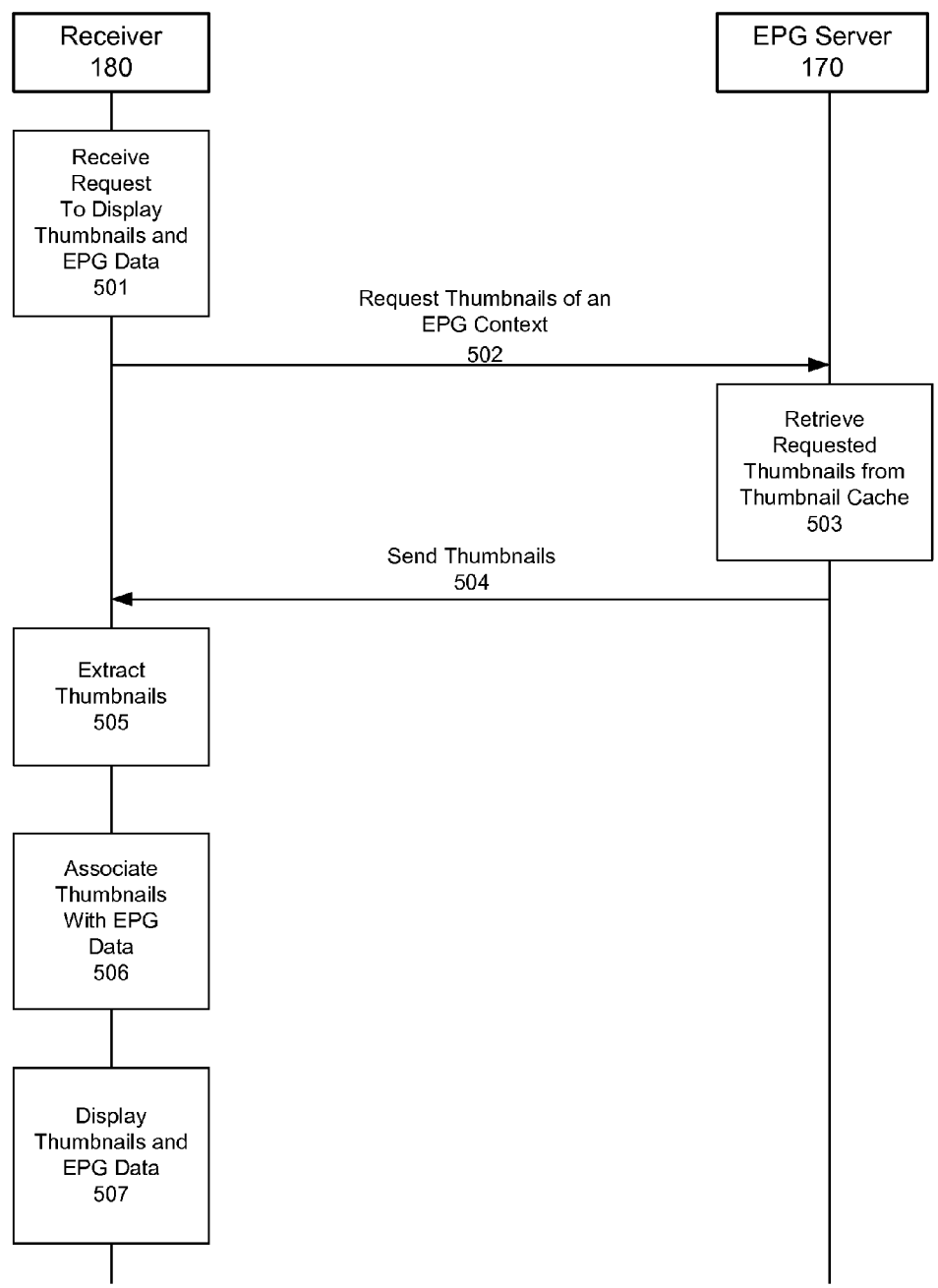
FIG. 5 is a sequence diagram illustrating an example of a method for retrieving a thumbnail image and EPG data for a television program for display, in accordance with an embodiment of the invention.

FIG. 5 illustrates a sequence diagram illustrating the communications between a receiver 180 and the EPG server 170. In one example, the receiver 180 receives 501 a request from the viewer to display EPG for a plurality of channels or television programs. The receiver sends 502 a request to the EPG server 170 for thumbnails of the EPG context (e.g., the requested television channels and programs). The EPG server 170 retrieves 503 the thumbnails for the requested EPG context from the thumbnail cache 160. The EPG server 170 sends 504 the thumbnails to the receiver 180, for example in a data package. The receiver 180 extracts 505 the thumbnail images from the data package and associates 506 the thumbnail images with the EPG data 506. The receiver then displays 507 the thumbnails and associated EPG data.

The methods and systems described above can be re-iterated and performed for multiple still frame images from a plurality of programs and channels. The steps can be performed simultaneously (e.g., in parallel) for a plurality of images, for example. Numerous still frame images can be filtered, generated into thumbnail images, and selected for display with EPG data.

In addition, instead of the receiver requesting current thumbnails when the user asks to display the EPG, the EPG server 170 can periodically (e.g., every 30 seconds) transmit a set of thumbnail images to all receivers that in operative communication with the server 100 for a corresponding set of broadcast channels, thereby keeping each receiver up to date with the current thumbnails.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for automatically generating a thumbnail image for display, the method comprising:
    receiving, by a server from a source, EPG data for a program on a channel, the EPG data including a default image;
    capturing, by the server, a still frame image from a video stream of the program on the channel;
    applying, by the server, a plurality of content filters to the still frame image to determine whether the still frame image is suitable for display;
    responsive to determining that the still frame image is suitable for display:
        generating, by the server, a thumbnail image from the still frame image; and
        providing, by the server to a receiver, the thumbnail image with the EPG data instead of the default image in response to receiving a request from a user for the EPG data; and
    responsive to determining that the still frame image is not suitable for display:
        providing, by the server to the receiver, the default image included with the received EPG data in response to receiving the request from the user for the EPG data.

2. The method of claim 1, further comprising storing the default image in a database in association with the EPG data for the channel and the program.

3. The method of claim 1, wherein responsive to providing the thumbnail image to the receiver, the thumbnail image and the EPG data are displayed associated with the program to the user.

4. The method of claim 1, wherein applying a plurality of content filters comprises determining whether the image is an offensive image.

5. The method of claim 1, wherein applying a plurality of content filters comprises determining whether the image is a defective image.

6. The method of claim 5, wherein determining whether the image is a defective image comprises performing an image contrast analysis.

7. The method of claim 5, wherein the defective image is a black picture or blue picture.

8. The method of claim 1, wherein applying a plurality of content filters to the still frame image comprises determining whether the image is an advertisement.

9. The method of claim 8, wherein determining whether the image is an advertisement comprises comparing the still frame image with a sample of one or more advertisement images.

10. A method for automatically generating a thumbnail image for a plurality of channels for display, the method comprising:
    receiving, by a server from a source for each of a plurality of channels, EPG data for a program on the channel, the EPG data including a default image;
    capturing, by the server for each of the plurality of channels, a still frame image from a video stream of the program on the channel;
    for each of the plurality of channels,
        applying, by the server, a plurality of content filters to the still frame image captured from the video stream from the program on the channel, the plurality of content filters applied to determine whether the still frame image is suitable for display;
        responsive to determining that the still frame image is suitable for display:
            generating, by the server, a thumbnail image from the still frame image; and
            providing, the server to a receiver, the thumbnail image with the EPG data for the program instead of the default image in response to receiving a request from a user for EPG data for the channel; and
        responsive to determining that the still frame image is not suitable for display:
            providing, by the server to the receiver, the default image included with the received EPG data for the program in response to receiving the request from the user for EPG data for the channel.

11. The method of claim 10, further comprising storing the default image in a database in association with the EPG data for the channel and the program.

12. The method of claim 10, wherein responsive to providing the thumbnail image to the receiver, the thumbnail image and EPG data for the program are displayed to the user.

13. The method of claim 10, wherein applying a plurality of content filters comprises determining whether the still frame image is an offensive image or a pornographic image.

14. The method of claim 10, wherein applying a plurality of content filters comprises determining whether the image is a defective image.

15. The method of claim 14, wherein determining whether the image is a defective image comprises performing an image contrast analysis.

16. The method of claim 14, wherein the defective image is a black picture or a blue picture.

17. The method of claim 10, wherein applying a plurality of content filters to the still frame image comprises determining whether the image is an advertisement.

18. The method of claim 17, wherein determining whether the image is an advertisement comprises comparing the still frame image with a sample of one or more advertisement images.

19. A computer program product for automatically generating a thumbnail image for a channel, the computer program product comprising a non-transitory computer-readable storage medium containing computer program code for:

receiving, by a server from a source, EPG data for a program on a channel, the EPG data including a default image;

capturing, by the server, a still frame image from a video stream of the program on the channel;

applying, by the server, a plurality of content filters to the still frame image to determine whether the still frame image is suitable for display;

responsive to determining that the still frame image is suitable for display:

generating, by the server, a thumbnail image from the still frame image; and providing, by the server to a receiver, the thumbnail image with the EPG data instead of the default image in response to receiving a request from a user for the EPG data; and responsive to determining that the still frame image is not suitable for display:

providing, by the server to the receiver, the default image included with the received EPG data in response to receiving the request from the user for the EPG data.

20. The computer program product of claim 19, further comprising computer program code for storing the default image in a database in association with the EPG data for the channel and the program.

21. The computer program product of claim 19, wherein responsive to providing the thumbnail image to the receiver, the thumbnail image and the EPG data are displayed to the user.

22. The computer program product of claim 19, wherein applying a plurality of content filters comprises determining whether the still frame image is an offensive image or a pornographic image.

23. The computer program product of claim 19, wherein applying a plurality of content filters comprises determining whether the image is a defective image.

24. The computer program product of claim 23, wherein determining whether the image is a defective image comprises an image contrast analysis.

25. The computer program product of claim 23, wherein the defective image is a black picture or a blue picture.

26. The computer program product of claim 19, wherein applying a plurality of content filters to the still frame image comprises determining whether the image is an advertisement.

27. The computer program product of claim 26, wherein determining whether the image is an advertisement comprises comparing the still frame image with a sample of one or more advertisement images.

28. A method for automatically generating a thumbnail image for display, the method comprising:

receiving, by a server from a source, program data associated with a program on a channel, the program data including a default image;

capturing, by the server, a still frame image from a video stream of the program on the channel;

applying, by the server, a plurality of content filters to the still frame image to determine whether the still frame image is suitable for display;

responsive to determining that the still frame image is suitable for display:

generating, by the server, a thumbnail image from the still frame image; and providing, by the server to a receiver, the thumbnail image with the program data instead of the default image in response to receiving a request from a user for the program data; and responsive to determining that the still frame image is not suitable for display:

providing, by the server to the receiver, the default image included with the received program data in response to receiving the request from the user for the program data.

29. A computer program product for automatically generating a thumbnail image for display, the computer program product comprising a non-transitory computer-readable storage medium containing computer program code for:

receiving, by a server from a source, program data associated with a program on a channel, the program data including a default image;

capturing, by the server, a still frame image from a video stream of the program on the channel;

applying, by the server, a plurality of content filters to the still frame image to determine whether the still frame image is suitable for display;

responsive to determining that the still frame image is suitable for display:

generating, by the server, a thumbnail image from the still frame image; and providing, by the server to a receiver, the thumbnail image with the program data instead of the default image in response to receiving a request from a user for the program data; and responsive to determining that the still frame image is not suitable for display:

providing, by the server to the receiver, the default image included with the received program data in response to receiving the request from the user for the program data.

* * * * *